United States Patent [19]
Chiu et al.

[11] Patent Number: 6,074,971
[45] Date of Patent: Jun. 13, 2000

[54] CERAMIC FERROELECTRIC COMPOSITE MATERIALS WITH ENHANCED ELECTRONIC PROPERTIES BSTO-MG BASED COMPOUND-RARE EARTH OXIDE

[75] Inventors: Luna H. Chiu, Abingdon; Louise C. Sengupta, Warwick; Steven Stowell, Havre de Grace; Somnath Sengupta, Warwick; Jennifer Synowczynski, Joppa, all of Md.

[73] Assignee: The United States of America as represented by the Secretary of the Army, Washington, D.C.

[21] Appl. No.: 09/191,546

[22] Filed: Nov. 13, 1998

[51] Int. Cl.$^7$ .......................... C04B 35/468; C04B 35/47
[52] U.S. Cl. .................................................. 501/139
[58] Field of Search ...................... 501/137, 139

[56] References Cited

U.S. PATENT DOCUMENTS

| | | | |
|---|---|---|---|
| 4,781,859 | 11/1988 | Noi .......................... | 501/139 |
| 5,268,342 | 12/1993 | Nishiyama et al. ..................... | 501/139 |
| 5,403,797 | 4/1995 | Ohtani et al. ........................... | 501/139 |
| 5,427,988 | 6/1995 | Sengupta et al. ....................... | 561/137 |
| 5,635,434 | 6/1997 | Sengupta et al. ......................... | 501/138 |
| 5,801,111 | 9/1998 | Wada et al. ............... | 501/139 |
| 5,977,006 | 11/1999 | Iguchi et al. .............................. | 501/139 |

*Primary Examiner*—Karl Group
*Attorney, Agent, or Firm*—Paul S. Clohan, Jr.; U. John Biffoni

[57] ABSTRACT

Ceramic ferroelectric composite materials comprising barium strontium titanate/magnesium and oxygen-containing compound composite further doped with rare earth (lanthanide) oxides. More particularly, these inventive composites are comprised of $Ba_{1-x}Sr_xTiO_3/Mg$—O based compound/rare earth oxide composite, wherein x is greater than or equal to 0.0 but less than or equal to 1.0, and wherein the weight ratio of BSTO to Mg compound may range from 99.75–20 wt. % BSTO to 0.25–80 wt. % Mg compound, and wherein said rare earth oxide additive comprises less than about 10 mole percent of the composite. The rare earth oxides of the composite include all oxides of the lanthanide series elements including scandium and yttrium, as well as combinations thereof. The magnesium-based compound may be selected from the group consisting of MgO, $MgZrO_3$, $MgZrSrTiO_3$, $MgTiO_3$, and $MgCO_3$. This new class of composite materials has enhanced electronic properties including: low dielectric constants; substantially decreased electronic loss (low loss tangents); increased tunability; increased temperature stability; decreased sintering temperatures; and low curie temperatures. The electronic properties of these new materials can be tailored for various applications including phased array antenna systems, capacitors, transmission wire, wireless communication, and pyroelectric guidance devices.

24 Claims, 4 Drawing Sheets

CERAMIC FERROELECTRIC COMPOSITE MATERIALS WITH ENHANCED ELECTRONIC PROPERTIES BSTO-MG BASED COMPOUND-RARE EARTH OXIDE

GOVERNMENT INTEREST

The invention described herein may be manufactured, used and/or licensed by or for the United States Government.

FIELD OF THE INVENTION

The present invention pertains generally to ceramic ferroelectric composite materials having enhanced electronic properties. More particularly, the present invention is directed to a ceramic ferroelectric composite comprising barium strontium titanate, $Ba_{1-x}Sr_xTiO_3$ ($BaTiO_3$—$SrTiO3$; referred to herein as BSTO), and compounds containing both magnesium and oxygen, wherein said BSTO/Mg—O compound composite is further doped with rare earth (lanthanide) oxides. In a preferred embodiment, the magnesium-containing compound comprises magnesia (MgO), thus forming the composite BSTO/MgO/rare earth oxide. The addition of rare earth oxides to the BSTO/MgO composite creates a new class of ferroelectric materials having improved electronic and microwave properties which can be tailored for specific applications.

BACKGROUND OF THE INVENTION

There exists a need for the fabrication of ceramic materials having improved electronic properties which may be adjusted for a particular intended use. The present invention pertains to novel ceramic ferroelectric composite materials for use, for example, in low loss dielectric and ferroelectric applications such as wave-guides in phased array antennas and dielectrics in capacitors.

The ferroelectric materials are a replacement for the more expensive current driven ferrites that are currently used in phased array antennas. The present invention describes ferroelectric materials which provide adequate phase shift and have improved material properties which can be tailored for various applications. These properties include: (a) lower dielectric constants; (b) substantially decreased electronic loss, i.e., low loss tangents (tan δ); (c) increased tunability; (d) increased temperature stability; (e) decreased sintering temperature during manufacture; and (f) low Curie temperatures.

Current attempts to use ferroelectric materials employ porous ceramics whose properties are less than ideal for their intended applications. Porous ceramics of the barium strontium titanate type, $Ba_{1-x}Sr_xTiO_3$, are commonly employed in ceramic phase shifter antennas. However, these materials display certain deficiencies due to manufacturing process difficulties and expense, as well as in their overall electronic and microwave properties. These deficiencies include electronic inhomogeneity, structural weakness, difficult reproducibility and process control during manufacture, and large loss tangents (tan δ).

Barium strontium titanate, $Ba_{1-x}Sr_xTiO_3$ ($BaTiO_3$—$SrTiO_3$), also referred to herein as BSTO, has been known to be used for its high dielectric constant, ranging from approximately 200 to 6,000, in various antenna applications. This was set forth by Richard W. Babbitt et al. in their publication, "Planar Microwave Electro-Optic Phase Shifters," *Microwave Journal,* Volume 35(6), June 1992. This publication concluded that more research needs to be conducted in the materials art to produce materials having more desirable electronic properties.

To address this need, it was subsequently discovered that BSTO could be combined with various metal oxides to produce ferroelectric composites having different and improved properties for particular applications. See, for example; U.S. Pat. No. 5,312,790 describing BSTO-alumina; U.S. Pat. No. 5,486,491 describing BSTO-zirconia; U.S. Pat. No. 5,635,433 describing BSTO-ZnO; U.S. Pat. No. 5,635,434 describing BSTO-magnesium based compounds incorporated by reference herein; and U.S. Pat. No. 5,427,988 describing BSTO-MgO composites and incorporated by reference herein. Of these, the BSTO-MgO composite has proven particularly important in that it possesses superior electronic properties for use in antenna systems.

The present invention provides a new class of ceramic ferroelectric composite materials with enhanced electronic properties comprising $Ba_{1-x}Sr_xTiO_3$—Mg and O containing compound composite, said composite being additionally doped with rare earth (lanthanide) oxides. The magnesium and oxygen containing compound is preferably MgO, but can also be selected from the group consisting of $MgZrO_3$, $MgZrSrTiO_3$, $MgTiO_3$, and $MgCO_3$. The doping can be carried out either with individual rare earth oxides or in combinations thereof. The rare earth oxides encompassed in the present invention include oxides of scandium (Sc), yttrium (Y), lanthanum (La), cerium (Ce), praseodymium (Pr), neodymuim (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Where the rare earth element is represented by M, the oxides are generally of the formula $M_2O_3$, although cerium gives cerium oxide $CeO_2$. Moreover, it is intended that the rare earth oxide additives of the present invention include all oxidation states of the rare earth elements.

SUMMARY OF THE INVENTION

Accordingly, it is an object of the present invention to provide a new class of ceramic ferroelectric composite materials having enhanced electronic properties suitable for, but not limited to, use in phased array antenna systems and capacitors.

It is a further object of the present invention to provide a new class of materials comprising a barium strontium titanate-magnesium and oxygen containing compound composite further doped with rare earth oxides.

It is a further object of the present invention to provide a new class of materials comprising barium strontium titanate-magnesium oxide composite further doped with rare earth oxides.

It is a further object of the present invention to provide a new class of materials having electronic properties that can be tailored for specific applications such as for use in wave-guides in phased array antenna systems, or as dielectrics in capacitors.

It is a further object of the present invention to provide a new class of materials having low dielectric constants, substantially decreased electronic loss (low loss tangents), increased tunability, increased temperature stability, decreased sintering temperatures during manufacturing, and low Curie points.

It is a further object of the present invention to provide a new class of materials useful in low loss dielectric and ferroelectric applications such as, but not limited to, phased array antenna systems, capacitors, transmission wire, wireless communications, and pyroelectric guidance devices.

It is a further object of the present invention to provide a new class of materials which are tunable with very low loss insertion and which can be readily used in a wide range of frequencies, for example, from about 100 kHz to about 77 GHz.

Other objects and advantages of the present invention will become apparent as a description thereof proceeds.

In satisfaction of the foregoing objects and advantages, the present invention provides a novel class of ceramic ferroelectric materials having improved electronic properties, said materials comprising $Ba_{1-x}Sr_xTiO_3$—Mg and oxygen containing compounds doped with rare earth oxides, wherein x is greater than or equal to 0.0 but less than or equal to 1.0, and wherein the weight ratio of BSTO to Mg containing compound may range from 99.75–20 wt. percent BSTO to 0.25–80 wt. percent magnesium compound, and wherein said rare earth oxide additive comprises up to 10 mole percent of the composite. Preferably, x=0.35 to 0.45, and for many applications the rare earth oxide is added in an amount of about 0.5 mole percent. In addition, the magnesium-containing compound may be selected from the group consisting of MgO, $MgZrO_3$, $MgZrSrTiO_3$, $MgTiO_3$, and $MgCO_3$.

DESCRIPTION OF THE PREFERRED EMBODIMENTS

Figure 1:
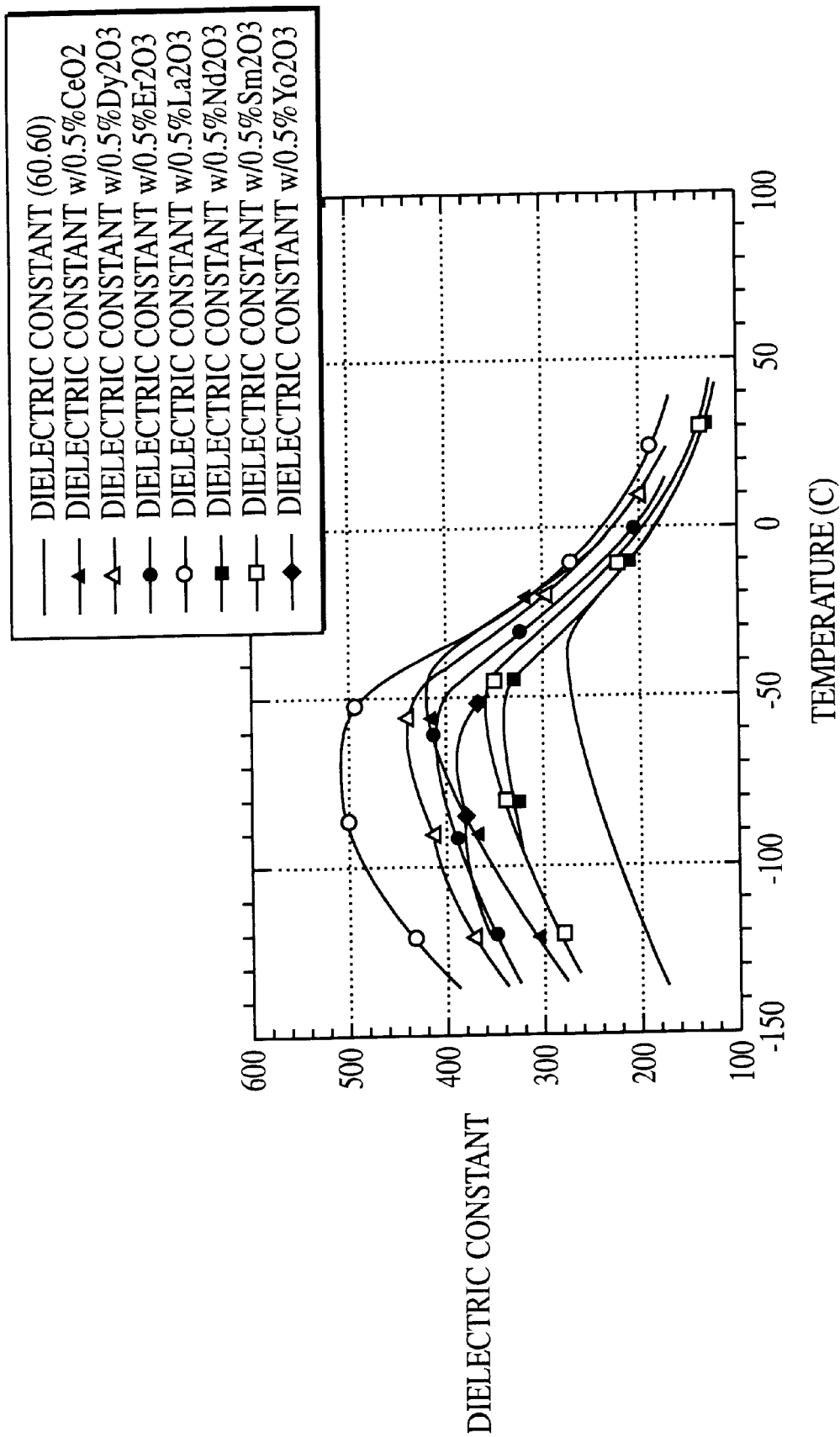
FIG. 1 is a graph showing dielectric constant versus temperature for composites of 40 wt. percent BSTO ($Ba_{0.6}Sr_{0.4}TiO_3$) and 60 wt. percent MgO with the addition of 0.5 mole percent of various rare earth oxide dopants.

The subject matter of the present invention relates to a new class of ceramic materials which have sought-after properties for application in, for example, phased array antenna systems or capacitors. These materials are superior to other currently employed ferroelectric materials because they have enhanced electronic properties which can be tailored for specific applications.

When one considers the optimization of electronic properties for ceramic materials, the following parameters must be taken into consideration:

(1) Dielectric constant: Dielectric constant is related to the energy storage in the material. In general, the dielectric constant should be low, ranging from approximately 30 to 2,500. A lower dielectric constant is preferable for wave-guides so that impedance matching for the circuit is easier. This low dielectric constant range does not decrease the phase shifting ability of the material if a sufficient length of the material is used, as insertion loss does not depend on the dielectric constant. Also, since the loss tangent (tan δ) increases with increasing dielectric constant for these ferroelectric materials, lower dielectric constant materials tend to have lower loss tangents and, therefore, less insertion loss.

(2) Low Insertion Loss: The loss tangent (intrinsic to the material) is related to the power dissipation in a material, i.e., it is a measure of how a material serves to dissipate or absorb incident energy (microwave) and therefore is most effective in antenna devices when the loss tangent is in the range of 0.001 or less. The low loss tangent serves to decrease the insertion loss and hence increase the phase shifting per decibel of loss. Generally, as the frequency of operation increases, the dielectric loss tangent also increases. This restricts the microwave designer's ability to develop efficient high frequency devices. Extremely low loss materials (0.0007) can be used at millimeter wave frequencies.

(3) Tunability: Tunability is a measure of how much the dielectric constant changes with applied voltage and is defined as (dielectric constant with no applied voltage)–(dielectric constant with an applied voltage)/(dielectric constant with no applied voltage). For simplicity, tunability can be represented as T $$T=(X-Y)/X$$

wherein,

X=dielectric constant with no applied voltage; and

Y=dielectric constant with an applied voltage.

The amount of phase shifting ability is directly related to tunability, therefore, higher tunabilities are desired. The tunability of a material under an electric field of 2.0 V/μm can range from 1% to 60% depending upon the materials employed. Electronic tunabilities at a field of 2 volts/micron would range from 4% to 50% for this new class of materials.

(4) Temperature Stability: The temperature stability of a material can be measured by its $TCP_{ppm}$ which is defined as:

$$TCP_{ppm}=(\epsilon_{max}-\epsilon_{ref})/\epsilon_{ref}(T_{max}-T_{ref})$$

wherein, $\epsilon_{max}$=the maximum dielectric constant in the temperature range of interest;

$\epsilon_{ref}$=the dielectric constant at the reference point;

$T_{max}$=temperature of maximum dielectric constant; and $T_{ref}$=temperature of reference point.

$TCP_{ppm}$ then represents a percentage change equal to parts per million. As the TCP is decreased the temperature stability of the material increases. Temperature stability allows these materials to be used in applications such as high dielectric substrates. In addition, with increased temperature stability the material can be used in applications where there is a wide range of operating temperatures, thereby preventing the need for environmental controls.

(5) Curie Temperature ($T_c$): This is the temperature at which the peak dielectric constant occurs for a material. It is also the temperature at which the material changes state from paraelectric to ferroelectric. For many applications, such as at high altitudes, low curie points (below −50° C.) are beneficial because the material will not then change phase at the operating temperature, thereby preventing the need for heating or protection circuitry.

The materials within the scope of the present invention can be tailored to fall within the optimum characteristics outlined above. These novel materials have less loss (lower loss tangents, tan δ) than BSTO-MgO composite material at both 250 kHz and 10 GHz frequencies. Lowering of insertion loss with these materials will result in fewer difficulties for the application of ferroelectrics into phased array antennas. Moreover, these materials will be more attractive for applications in, but not limited to, transmission wire, wireless communications, low powered capacitors and pyroelectric guidance devices.

In addition, tunability of these materials remains high, i.e., well within the requirements for application to phased array antenna systems. In some specific cases, the tunability of the material has been doubled due to the addition of the rare earth oxides. For example, when 0.5 mole percent $La_2O_3$ is added to a composite containing 40 weight percent $Ba_{0.6}Sr_{0.4}TiO_3$ and 60 weight percent MgO, the tunability increased by almost 40% over the non-rare earth doped material.

Furthermore, in some cases the addition of the rare earth oxide dopant to the BSTO-MgO material increased the temperature stability of the material without any detriment to other electronic properties. Additionally, another advantage provided by doping with rare earth oxides is that in some composites the sintering temperatures are 25° C. below that of the composites without the rare earth additive.

The novel materials of the present invention comprise $Ba_{1-x}Sr_xTiO_3$-Mg and oxygen containing compound ferroelectric composite material further doped with rare earth oxides, wherein x is greater than or equal to 0.0 but less than or equal to 1.0, and wherein the weight ratio of BSTO to Mg compound may range from 99.75–20 wt. percent BSTO to 0.25–80 wt. percent magnesium compound, and wherein said rare earth oxide additive comprises up to 10 mole percent of the composite. Preferably, x=0.35 to 0.45, and for many applications the rare earth oxide is added in an amount of about 0.5 mole percent. In addition, the magnesium-based compound may be selected from the group consisting of MgO, $MgZrO_3$, $MgZrSrTiO_3$, $MgTiO_3$, and $MgCO_3$.

The rare earth oxides encompassed in the present invention include oxides of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Where the rare earth element is represented by M, the oxides are generally of the formula $M_2O_3$, although cerium gives cerium oxide $CeO_2$. Moreover, it is intended that the rare earth oxide additives of the present invention include all oxidation states of the rare earth elements. Thus, the inventive materials may be represented generally as BSTO-Mg and O Compound-M oxide. The magnesium-containing compound may be, for example, MgO, so that the new composite comprises preferably BSTO-MgO-M oxide. In addition, the doping may be carried out with combinations of rare earth oxides as opposed to individually.

There are many methods for producing these bulk materials. One of the basic methods begins by obtaining powders of barium titanate ($BaTiO_3$) and strontium titanate ($SrTiO_3$). The powders are then stoichiometrically mixed in a slurry of organic solvent, such as ethanol, and ball milled in a conventional manner using grinding media. This particular mixture is then air-dried and calcined at approximately 200–300 degrees below the sintering temperature for several hours. The resulting BSTO powder is then sieved and mixed with Mg compound, for example MgO, and the rare earth oxide, for example, $CeO_2$, in the correct ratios and re-ball milled in an organic solvent with a binder. The final mixture is then air-dried and subsequently dry pressed to near net shape at about 7,000 psi. The final samples are sintered in air at the correct temperatures. Sintering schedules may be ascertained by those skilled in that art using a dilatometer. After sintering, the sample can be machined and electroded for usage and analysis. The manufacturing process when using $MgCO_3$ in lieu of MgO is the same as that described above except that the starting materials are $BaCO_3$, $SrCO_3$, $TiO_2$, and $MgCO_3$ mixed in water as solvent.

Tables 1 and 2 set forth the electronic properties of various BSTO-MgO-rare earth oxide ceramic ferroelectric composite materials. These tables reflect data for composites made by the foregoing method, wherein the rare earth dopants, MgO, and the BSTO are mixed.

TABLE 1

Electrical Property Data for 40 weight % $Ba_{0.6}Sr_{0.4}TiO_3$ - 60 weight % MgO, plus 0.5 mole % of rare earth oxide

| Rare Earth Dopant | Room Temperature Dielectric Constant | Loss Tangent (tan δ) at 250 kHz | Percent Tunability (%) At 2 volts/micron | Curie Temperature (°C.) |
|---|---|---|---|---|
| No rare earth oxide | 126.82 | 0.0008 | 9.23 | −35 |
| $CeO_2$ | 129.91 | 0.00048 | 8.22 | −50 |
| $Dy_2O_3$ | 122.68 | 0.00045 | 6.48 | −60 |
| $Er_2O_3$ | 123.85 | 0.00047 | 6.76 | −60 |
| $La_2O_3$ | 165.58 | 0.0011 | 14.70 | −70 |
| $Nd_2O_3$ | 99.589 | 0.00072 | 8.00 | −60 |
| $Sm_2O_3$ | 104.10 | 0.00024* | 6.58 | −60 |
| $Yb_2O_3$ | 107.43 | 0.00034 | 5.94 | −65 |

*dispersive sample

TABLE 2

Electrical Property Data for 40 weight % $Ba_{0.55}Sr_{0.45}TiO_3$ - 60 weight % MgO, plus 0.5 mole % of rare earth dopant

| Rare Earth Dopant | Room Temperature Dielectric Constant | Loss Tangent (tan δ) at 250 kHz | Loss Tangent (tan δ) at 10 GHz | Percent Tunability (%) at 2 volts/micron | Curie Temperature (°C.) |
|---|---|---|---|---|---|
| None | 110.59 | 0.0005 | 0.00832 | 6.57 | −50 |
| $CeO_2$ | 100.00 | 0.0003 | 0.00694 | 5.50 | −60 |
| $Dy_2O_3$ | 104.68 | 0.0004 | 0.01404 | 4.44 | −70 |
| $Er_2O_3$ | 106.67 | 0.0004 | 0.01917 | 4.44 | −75 |
| $La_2O_3$ | 79.00 | 0.0014 | 0.0115 | 7.85 | −80 |
| $Nd_2O_3$ | 100.06 | 0.0008 | 0.006988 | 7.71 | −75 |
| $Sm_2O_3$ | 100.45 | 0.0016 | 0.0358 | 5.25 | −75 |
| $Yb_2O_3$ | 109.60 | 0.0004 | 0.010016 | 4.86 | −80 |

As evidenced by the data, the addition of rare earth oxides to BSTO-MgO composite can improve the electronic properties of the ferroelectric composite material. The dielectric constant stayed at low values which is ideal for the application of insertion into phased array antenna because these dielectrics should make impedance matching easier. Here again, the low dielectric constants do not decrease the phase shifting ability of the material if a sufficient length of the material is used. Also, in the case of using a second dopant such as $CeO_2$, warpage during sintering was minimal. Therefore, fabricating long lengths of this material can be accomplished fairly easily.

Also, as can be seen from the tables, the loss tangent can be lowered 30–50% from that of the undoped composite material by some of the rare earth dopants at low mole percentages. More specifically, the loss tangents for both low and microwave frequencies can be significantly decreased without detriment to the other electronic properties. For example, in the case of BSTO-MgO composite with 0.5 mole % of $CeO_2$ additive, the loss tangent at 250 kHz decreased from 0.0008 to 0.00048 which is a 40% reduction in loss tangent. In addition, for a BSTO-MgO composite with 0.5 mole % $CeO_2$ the loss tangent at 10 GHz is decreased from 0.0083 to 0.0069. This is a significant decrease in the microwave region.

Furthermore, the tunability of the materials is maintained and is well within the specification for phased array antennas. In the case of doping 40 wt. % $Ba_{0.6}Sr_{0.4}TiO_3$ and 60 wt. % MgO with 0.5 mole % $La_2O_3$, the tunability is 38% higher than that of the composite without the rare earth additive.

The Curie temperature, sintering temperatures, and temperature stability can all be improved by additions of specific rare earth additives. For example, in the case of BSTO-MgO composite with 0.5 mole % $Er_2O_3$ the sintering temperature is 30 degrees lower than 1450° C., which is the normal sintering temperature of the composite without rare earth additions. Temperature stability was improved by adding 10 mole % $Er_2O_3$ to BSTO-MgO producing a material having a TCP=156, whereas without the rare earth oxide the TCP=4661. In this case, the additive dampened the dielectric constant at the curie temperature, which improves temperature stability properties. The addition of rare earth additives in some cases causes a decrease in the curie temperature, broadening the applicability of these materials to, for example, avionics where the operating temperatures can be as low as −40° C. For example, BSTO-MgO with $La_2O_3$ additive has a Curie temperature of −70° C., whereas without the additive the curie temperature is −35° C.

Figure 2:
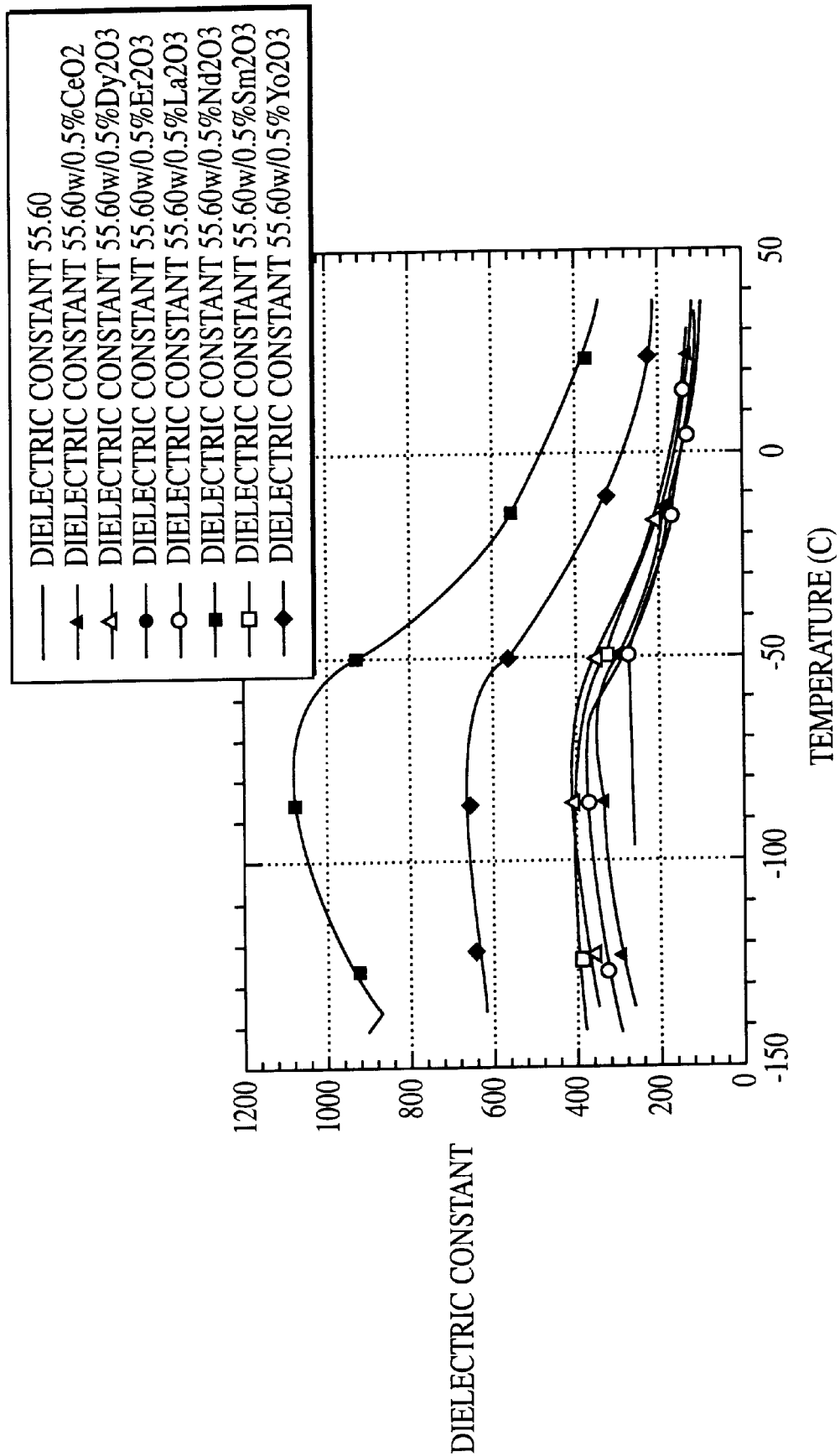
FIG. 2 is a graph showing dielectric constant versus temperature for composites of 40 wt. percent BSTO ($Ba_{0.55}Sr_{0.45}TiO_3$) and 60 wt. percent MgO with the addition of 0.5 mole percent of various rare earth oxide dopants.
Figure 3:
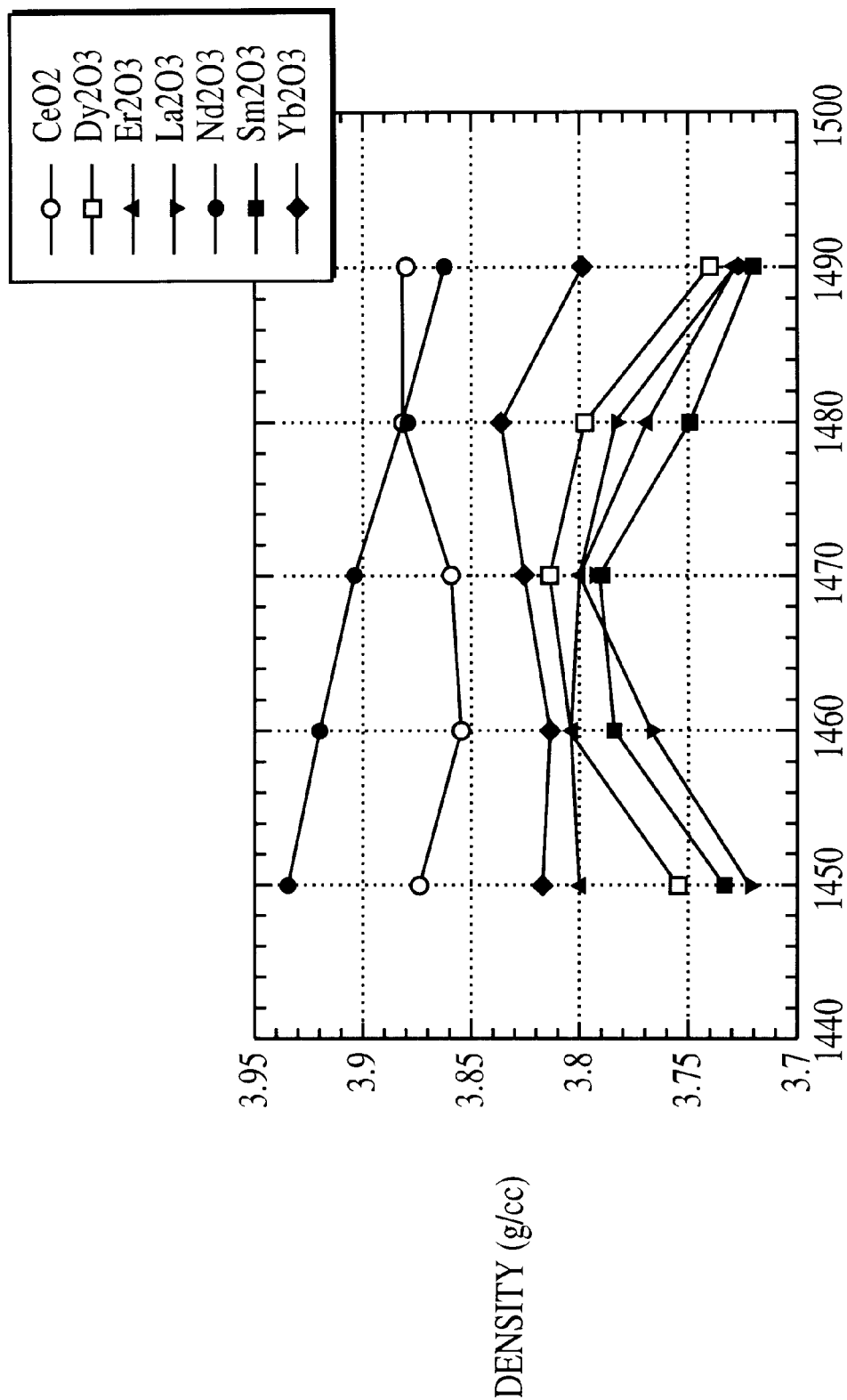
FIG. 3 is a graph showing measured density versus sintering temperature for composites of 40 wt. percent BSTO ($Ba_{0.6}Sr_{0.4}TiO_3$) and 60 wt. percent MgO with the addition of 0.5 mole percent of various rare earth oxide dopants.
Figure 4:
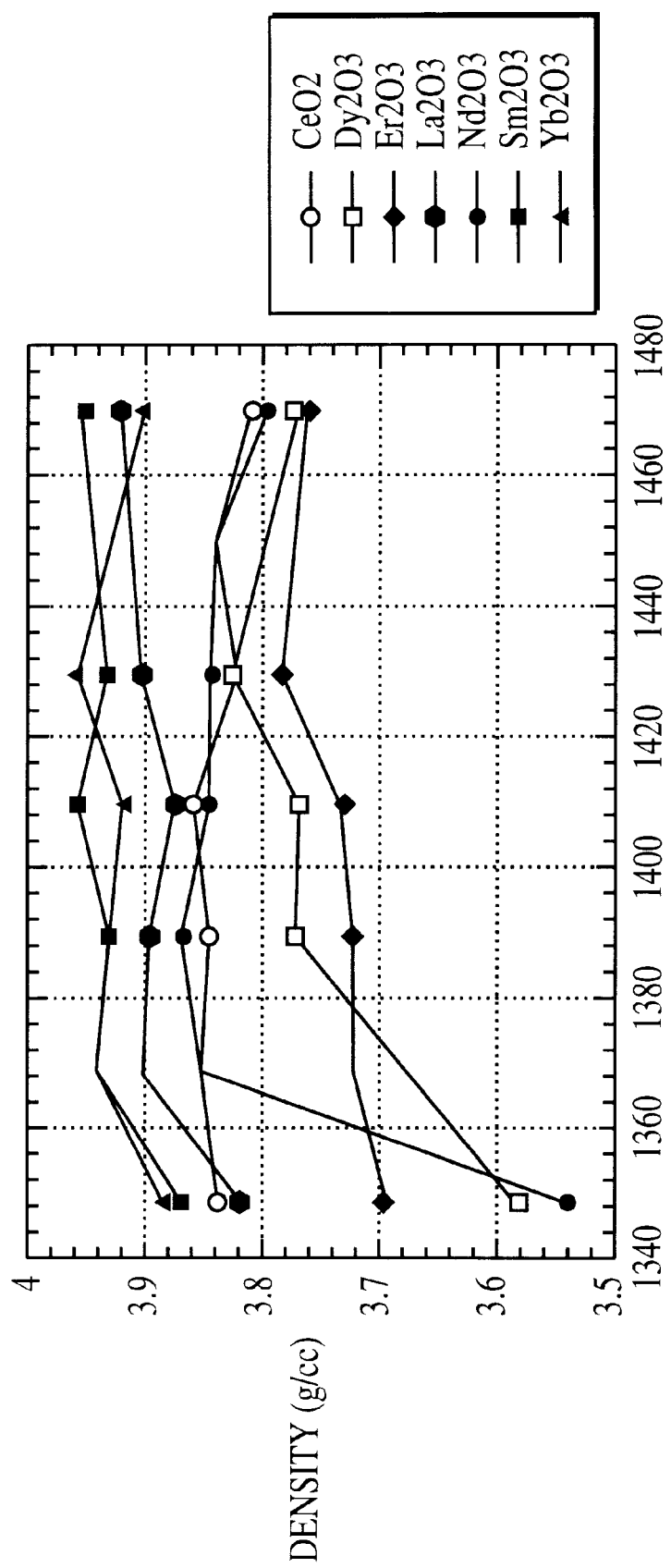
FIG. 4 is a graph showing measured density versus sintering temperature for composites of 40 wt. percent BSTO ($Ba_{0.55}Sr_{0.45}TiO_3$) and 60 wt. percent MgO with the addition of 0.5 mole percent various rare earth dopants.

As shown in the FIGS. 1 and 2, the dielectric constant remains within range over operating temperatures. FIGS. 3 and 4 show the measured densities versus sintering temperatures for the various composite materials, indicating that sintering temperatures are lowered for some rare earth doped materials. This lowered sintering temperature is, of course, useful during manufacturing.

While the particular embodiments of the present invention have been shown and described, it will be obvious to those skilled in the art that changes and modifications may be made without departing from this invention. It is therefore intended that the claims appended hereto include all such obvious modifications, changes, and equivalents as fall within the true spirit and scope of this invention.

What is claimed is:

1. A ceramic ferroelectric composite material, comprising:

(a) barium strontium titanate, said barium strontium titanate represented as $Ba_{1-x}Sr_xTiO_3$, wherein x is greater than 0.0 but less than 0.7;

(b) a compound containing both magnesium and oxygen; and (c) a rare earth oxide or a combination of rare earth oxides; wherein said barium strontium titanate, said magnesium containing compound, and said rare earth oxide or combination thereof are combined in said composite material.

2. The ceramic ferroelectric composite material of claim 1, wherein said barium strontium titanate is $Ba_{1-x}Sr_xTiO_3$ and wherein x=0.35 to 0.45.

3. The ceramic ferroelectric composite material of claim 1, wherein said magnesium containing compound is selected from the group consisting of MgO, $MgZrO_3$, $MgZrSrTiO_3$, $MgTiO_3$, and $MgCO_3$.

4. The ceramic ferroelectric composite material of claim 1, wherein said magnesium containing compound comprises MgO.

5. The ceramic ferroelectric composite material of claim 1, wherein said rare earth oxide is selected from the group consisting of scandium oxide, yttrium oxide, lanthanum oxide, cerium oxide, praseodymium oxide, neodymium oxide, promethium oxide, samarium oxide, europium oxide, gadolinium oxide, terbium oxide, dysprosium oxide, holmium oxide, erbium oxide, thulium oxide, ytterbium oxide, lutetium oxide, and combinations thereof.

6. The ceramic ferroelectric composite material of claim 5, wherein said rare earth oxide is selected from the group consisting of lanthanum oxide, cerium oxide, and neodymium oxide.

7. The ceramic ferroelectric composite material of claim 1, wherein the weight ratio of said barium strontium titanate to said magnesium compound ranges from about 99.75–20 percent by weight barium strontium titanate to about 0.25–80 percent by weight magnesium compound; and wherein said rare earth oxide is added to said barium strontium titanate and magnesium compound material at a molar percentage of less than about 10 mole percent.

8. The ceramic ferroelectric composite material of claim 7, wherein said magnesium compound is selected from the group consisting of MgO, $MgZrO_3$, $MgZrSrTiO_3$, $MgAl_2O_4$, $MgTiO_3$, and $MgCO_3$.

9. The ceramic ferroelectric composite material of claim 8, wherein said magnesium compound comprises MgO.

10. The ceramic ferroelectric composite material of claim 7, wherein said rare earth oxide is selected from the group consisting of scandium oxide, yttrium oxide, lanthanum oxide, cerium oxide, praseodymium oxide, neodymium oxide, promethium oxide, samarium oxide, europium oxide, gadolinium oxide, terbium oxide, dysprosium oxide, holmium oxide, erbium oxide, thulium oxide, ytterbium oxide, lutetium oxide, and combinations thereof.

11. The ceramic ferroelectric composite material of claim 10, wherein said rare earth oxide is selected from the group consisting of lanthanum oxide, cerium oxide, and neodymium oxide.

12. The ceramic ferroelectric composite material of claim 7, wherein said weight ratio of said barium strontium titanate to said magnesium compound is approximately 40 percent by weight barium strontium titanate to approximately 60 percent by weight magnesium compound.

13. The ceramic ferroelectric composite material of claim 12, wherein said magnesium compound comprises MgO.

14. The ceramic ferroelectric composite material of claim 12, wherein said barium strontium titanate comprises $Ba_{0.6}Sr_{0.4}TiO_3$.

15. The ceramic ferroelectric composite material of claim 12, wherein said barium strontium titanate comprises $Ba_{0.55}Sr_{0.45}TiO_3$.

16. The ceramic ferroelectric composite material of claim 12, wherein said rare earth oxide is added to said material at a molar percentage of about 0.5 mole percent.

17. The ceramic ferroelectric composite material of claim 12, wherein said rare earth oxides are selected from the group consisting of scandium oxide, yttrium oxide, lanthanum oxide, cerium oxide, praseodymium oxide, neodymium oxide, promethium oxide, samarium oxide, europium oxide, gadolinium oxide, terbium oxide, dysprosium oxide, holmium oxide, erbium oxide, thulium oxide, ytterbium oxide, lutetium oxide, and combinations thereof.

18. The ceramic ferroelectric composite material of claim 17, wherein said rare earth oxide is selected from the group consisting of lanthanum oxide, cerium oxide, and neodymium oxide.

19. The ceramic ferroelectric composite material of claim 1, wherein said material has a room temperature dielectric constant of from about 79 to about 166.

20. The ceramic ferroelectric composite material of claim 1, wherein said material has a loss tangent of less than 0.0008 at a frequency of 250 kHz.

21. The ceramic ferroelectric composite material of claim 1, wherein said material has a loss tangent of less than 0.04 at a frequency of 10 GHz.

22. The ceramic ferroelectric material of claim 1, wherein said material has a curie temperature of less than about −50° C.

23. The ceramic ferroelectric material of claim 1, wherein said material has a tunability of greater than 4.0 percent.

24. The ceramic ferroelectric material of claim 1, wherein said material has a temperature stability of $TCP_{ppm}$ in the range of 150 to 2000 ppm.

* * * * *